UNITED STATES PATENT OFFICE.

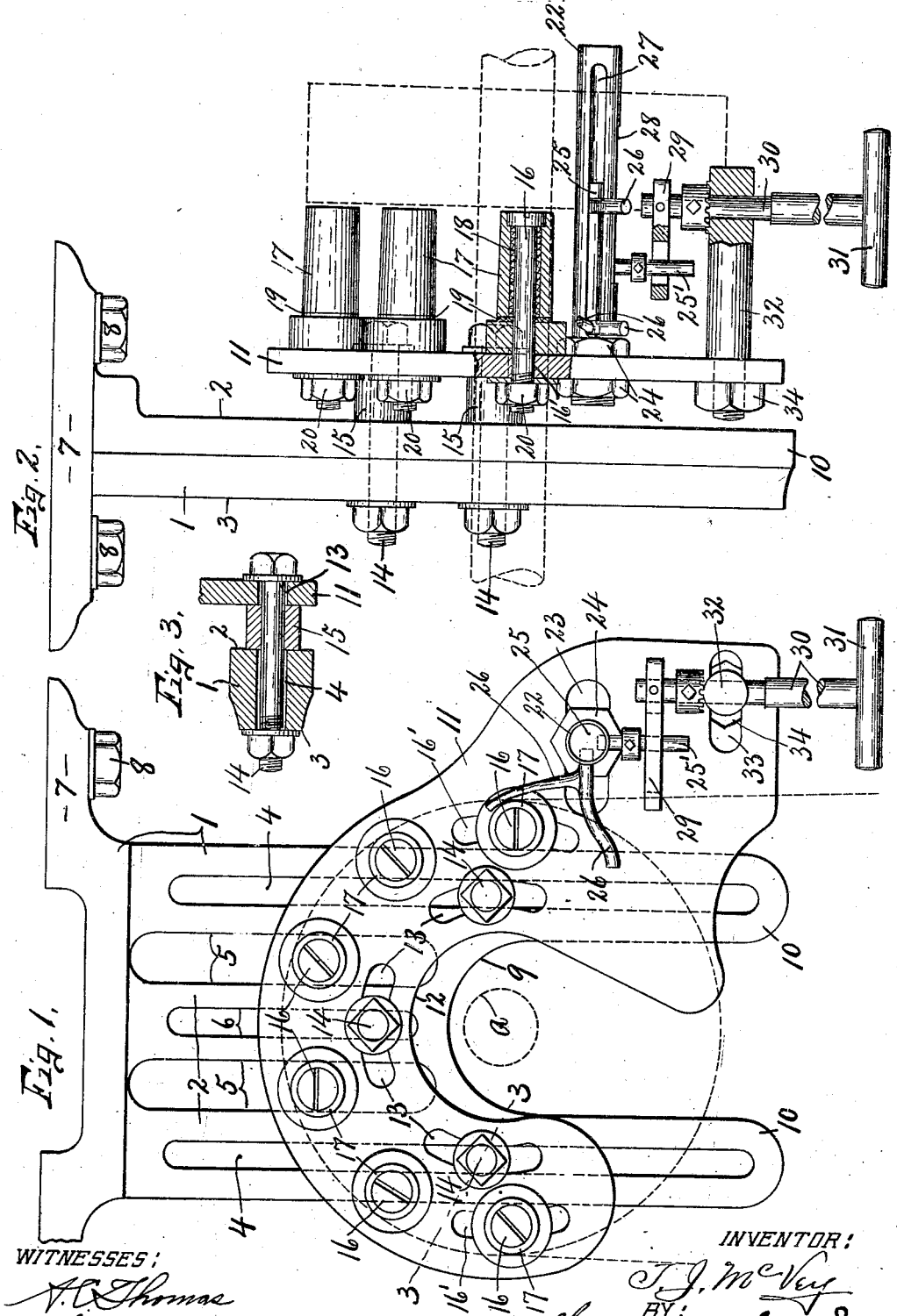

THEODORE J. McVEY, OF SYRACUSE, NEW YORK, ASSIGNOR TO CARLTON & McVEY, OF SYRACUSE, NEW YORK, A COPARTNERSHIP.

BELT-SHIFTER.

No. 842,808.  Specification of Letters Patent.  Patented Jan. 29, 1907.

Application filed March 23, 1906. Serial No. 307,612.

*To all whom it may concern:*

Be it known that I, THEODORE J. McVEY, of Syracuse, in the county of Onondaga, in the State of New York, have invented new and useful Improvements in Belt-Shifters, of which the following, taken in connection with the accompanying drawings, is a full, clear, and exact description.

This invention relates to certain improvements in belt-shifters involving the use of a fixed hanger adapted to be secured to the ceiling or partition of a building for supporting a reversible and invertible disk carrying a circular series of roller-bearings and adjustable circumferentially around the axis of the shaft.

The essential purpose of my invention is to combine the roller-supporting disk with the hanger in such manner that the disk may be readily adjusted or inverted to conform to different positions of the belt which it is adapted to support.

Another object is to enable the end rollers of the series to be adjusted around the axis of the shaft independently of the supporting-disk to conform to different degrees of lap of the belt upon the pulley with which the roller-supporting disk is associated.

Another object is to mount the belt-shifting device wholly upon the roller-supporting disk and to allow for its limited adjustment to conform to the adjustment of the end rollers of the series for different degrees of lap of the belt.

A further object is to provide for the vertical adjustment of the roller-supporting plate or disk to bring the rollers into exact coincidence with the plane of the pulley without adjusting the hanger.

A still further object is to slightly taper the rollers toward the pulley to permit the belt to be shifted easily to and from the pulley and rollers.

Another object is to interpose fiber bearings between the rollers and their metal supporting parts to prevent as far as practicable undue rattle or noise during the action of the belt upon the rollers.

Other objects and uses will be brought out in the following description.

In the drawings, Figure 1 is a face view of a belt-shifter and associated mechanisms involving the various features of my invention. Fig. 2 is a side elevation of the device seen in Fig. 1, showing in connection therewith a pulley in proximity to the free ends of the rollers. Fig. 3 is a sectional view taken on line 3 3 of Fig. 1.

In devices of this character it is not always convenient or possible to secure the hanger in exactly such relation as to bring the bearing-faces of the belt-rollers in a plane exactly coincident with the plane of the face of the pulley, nor is it always convenient or possible to adjust the hanger so as to bring the rollers into conformity with the direction of the travel of the belt, and therefore one of the essential purposes of my invention is to enable the hanger to be set or secured approximately in the desired position and then to adjust the roller-supporting plate thereon to conform to the face of the pulley and direction of travel of the belt, and in carrying out this object and others previously stated I provide a hanger 1, with oppositely substantially parallel faces 2 and 3 and a series of vertical and substantially parallel slots 4, 5, and 6, said hanger having one end formed with suitable attaching-flanges 7 for the reception of bolts 8, by which the hanger is rigidly secured to the ceiling or partition of a building, while the other end of the hanger is preferably bifurcated, forming a shaft-receiving opening or recess 9 and opposite arms 10, into which the vertical slots 4 extend, one at each side of the recess or shaft opening 9.

A substantially flat metal disk or plate 11 is adapted to be secured to either side of the hanger 2 and in this instance is provided with a shaft-opening 12, extending through one edge of the plate to allow it to be readily placed around the shaft, and is also formed with a series of—in this instance three—concentric slots or elongated openings 13, spaced a uniform distance apart end to end around the shaft and alined with the slots 4 and 6 for receiving suitable clamping-bolts 14, by which the plate is securely clamped to the hanger 1. This plate 11 is held some distance from the hanger by spacing-sleeves 15, each surrounding one of the bolts 14 and interposed between the adjacent faces of the plate 11 and hanger 2, the object of which is to afford clearance for the nuts by which the roller-supporting studs are secured to the plate 11 when the latter is adjusted to conform to the position of the belt. The plate 11 is also provided with a series of—in this instance six—bolt-openings arranged in a circular row concentric with the axis of the shaft, as $a$, and therefore concentric with the slots 13, for receiving a corresponding number of roller-supporting studs 16, upon which are mounted suitable metal rollers 17, each having an inner fiber bushing or sleeve 18 tightly fitted therein and forming a self-lubricating comparatively noiseless bearing for the roller upon its supporting-stud.

As a further means for reducing the noise a fiber washer or end-thrust bearing 19 is interposed between the inner end face of each roller and adjacent face of the plate 11, and each screw or stud 16 is provided with an annular shoulder abutting against the outer face of the plate 11 and has a head at its outer end seated in a suitable recess in the corresponding end of the roller to prevent endwise displacement of the rollers from their respective studs, said heads being usually slotted to receive a screw-driver whereby the studs may be removed or held while unscrewing their clamping-nuts, as 20, Fig. 2, which engage the threaded ends of the studs projecting through the apertures in the plate 11.

The bolt-openings, as 16', for the end studs 16 of the series of roller-supports are preferably elongated concentric with the axis of the shaft to afford a limited side adjustment of the end rollers 16 for belts having different degrees of lap—as, for example, in some instances it may be desired to use a hanger in connection with a pulley carrying a belt running to a larger pulley, and therefore the arc of contact upon the rollers would be less than if the belt were connected to a smaller pulley or crossed to transmit reverse motion, and by making the slots for the studs of the end rollers elongated concentric with the axis of the shaft or pulley with which the hanger is associated I am enabled to use the same hanger for different degrees of lap of the belt by simply adjusting the end rollers of the series to conform to such lap and then reclamping their supporting-studs in their adjusted positions.

One arm of the plate 11 is somewhat longer and broader than the other for receiving the belt-shifting mechanism, which consists, in this instance, of a tube 22, having one end threaded and inserted through an elongated slot 23 in the plate 11 and engaged by clamping-nuts 24, abutting against opposite faces of the plate 11. A shifting-bolt 25 is slidable endwise and guided within a tube 22 and is provided with a series of belt-shifting arms 26, projecting through a lengthwise slot 27 in said tube. Secured to the sliding bolt 25 is a depending stud 25', which projects through a second slot 28 in the tube 22 and is engaged by a crank-arm 29 on a vertical rock-shaft 30, the latter being provided with a suitable handpiece 31 within easy reaching distance of the operator. The crank-arm 29 is preferably provided with an elongated slot through which the stud 27 projects and whereby the shifting-bolt 25 is reciprocated back and forth in the tubular guide 22 as the shaft 30 is rocked in opposite directions by the handpiece 31. This handpiece is preferably journaled on a stud or laterally-projecting arm 32, having one end reduced and threaded and inserted through an elongated slot 33 in the plate 11 and clamped to said plate by a suitable nut 34. It is now apparent that the whole shifting mechanism, together with the belt-receiving rollers 17, are mounted upon a plate 11 and that the tubular guide 22 and stud 32 may be readily adjusted laterally a limited distance to conform to the adjustment of the end rollers for different degrees of lap of the belt.

By making the plate 11 substantially flat or with oppositely-parallel sides it may be reversed or inverted and either side applied to the rollers and their supporting-studs, and also the shifting mechanism may also be applied to either face of the plate, and by making the slots 13 elongated and concentric with the axis of the shaft the plate may be shifted circumferentially around said axis a limited distance to conform to the direction of travel of the belt from the pulley with which the shifting device is associated—in fact, the reversibility and invertibility of the plate upon the hanger enables the device to be used with belts running in almost any direction from the shaft $a$.

What I claim is—

1. A belt-shifter comprising a hanger having lengthwise slots and bolts adjustable lengthwise therein, a roller-supporting plate having a series of concentric elongated slots and receiving said bolts, which latter serve to clamp the plate to the hanger, and a series of rollers rotatably mounted upon the plate about a common axis, the end rollers of the series being separately adjustable about said axis to conform to different degrees of lap of the belt.

2. In a belt-shifting device of the class described, a hanger having a series of parallel lengthwise slots, a roller-supporting plate having a series of elongated slots arranged about a common center, bolts passed through the slots in the plate and hanger for clamping the plate to said hanger, and a series of rollers mounted on the plate equidistant from said center.

3. In a belt-shifting device of the character described, the combination, of a roller-supporting plate and hanger therefor, said plate being adjustable around, and toward and from a common axis, means for clamping the plate in its adjusted position, and a series of rollers mounted on the plate and arranged concentrically with said axis.

4. In a belt-shifting device of the character described, a hanger having a series of parallel slots, a roller-supporting plate having elongated slots arranged about a common center and registered with the slots in the hanger, clamping-bolts passed through the slots in the hanger and plate for securing said plate to the hanger, a sliding bolt and guide therefor adjustably mounted on the plate, belt-shifting arms projecting from the bolt, and means for shifting said bolt lengthwise of its guide.

5. In a belt-shifting device of the character described, a hanger having parallel slots, a roller-supporting plate having elongated slots arranged about a common center and registering with the slots in the hanger, clamping-bolts passed through said slots for securing the plate to the hanger, a series of rollers arranged in a circular arc, the end rollers of the series being adjustable lengthwise of said arc, a belt-shifting bolt and guide therefor mounted on the plate and adjustable toward and from the center of said arc, means for securing the guide in its adjusted position, and means for shifting the sliding bolt.

6. In a belt-shifting device of the character described, a hanger and a separate roller-supporting plate having opposite substantially flat faces to permit the plate to be inverted or reversed and either side arranged next to the hanger, a series of rollers mounted in a circular arc upon the plate, the rollers at the ends of the arc being adjustable lengthwise of said arc, means for clamping the adjustable rollers in their adjusted position a sliding bolt and guide therefor mounted on the plate and adjustable toward and from the center of the arc, and belt-shifting arms projecting from the bolt.

7. In a belt-shifting device of the character described, a hanger having a series of vertical slots, a plate having a series of lengthwise slots arranged about a common center, clamping-bolts passed through said slots for securing the plate to the hanger, a series of roller-supporting studs secured to the plate in a circular arc, rollers mounted upon said studs, the studs at the end of the arc being adjustable lengthwise of the arc, a guide mounted on the plate and adjustable relatively to one of the adjustable roller-studs, a sliding bolt movable in said guide and provided with belt-shifting arms, and means mounted on the plate for shifting the sliding bolt endwise in the guide.

In witness whereof I have hereunto set my hand this 16th day of March, 1906.

THEODORE J. McVEY.

Witnesses:
 H. E. CHASE,
 J. M. HAMMEKEN.